J. O. HAMMELL.
STEAM TRAP.
APPLICATION FILED SEPT. 27, 1917.
1,304,562.
Patented May 27, 1919.
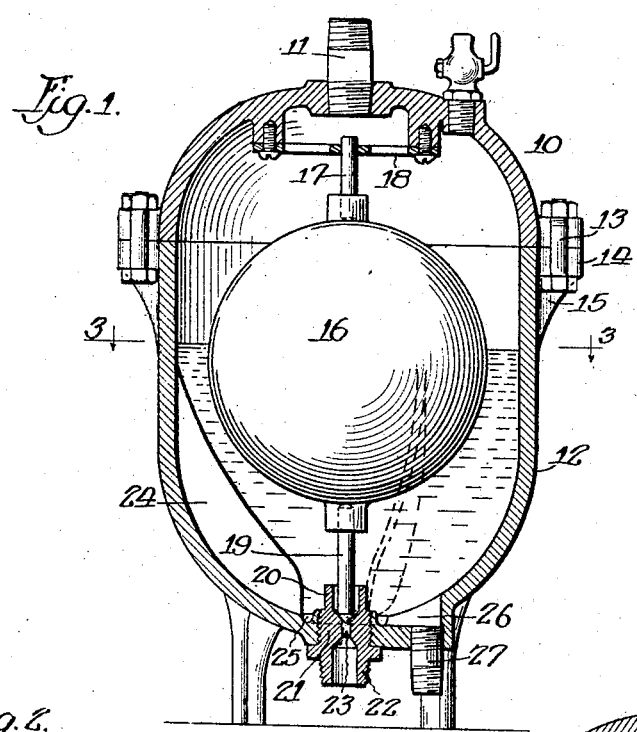
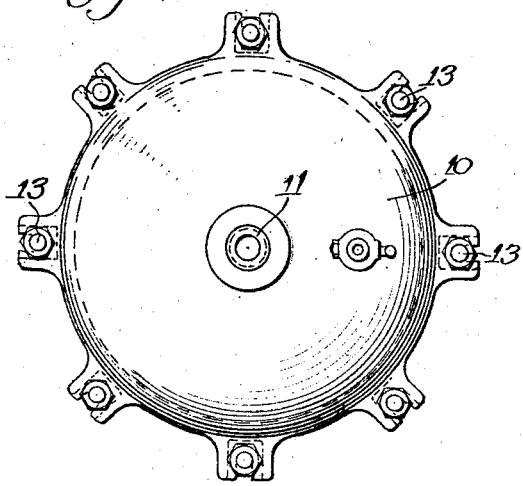
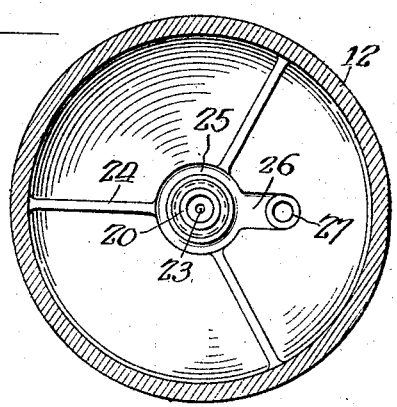
Inventor:
John O Hammell
by Chas T Murray
Atty.

UNITED STATES PATENT OFFICE.

JOHN O. HAMMELL, OF CHICAGO, ILLINOIS.

STEAM-TRAP.

1,304,562.   Specification of Letters Patent.   Patented May 27, 1919.

Application filed September 27, 1917. Serial No. 193,477.

*To all whom it may concern:*

Be it known that I, JOHN O. HAMMELL, a citizen of the United States, and resident of Chicago, in the county of Cook and State of Illinois, have invented certain new and useful Improvements in Steam-Traps, of which the following is a specification.

My invention relates to steam traps and particularly to an improvement on the construction disclosed in Patent No. 635,703 of October 24, 1899.

An object in the present construction is to increase the capacity of such devices to a material extent. This is accomplished by curving or rounding the lower end of the casing or container; that is, making it hemispherical in outline. The action of the contained liquid on the float is, due to the curve of the walls and float, to maintain the float in an elevated position much longer and permit the discharge of more liquid than was possible with a flat bottom casing.

One of the important improvements is that of providing one or more radial webs which project into the liquid storage space. The webs have two functions, first, that of preventing the whirl of water as it is discharged through the outlet, and, second, that of segregating any sediment, scale or other solid matter which might tend to obstruct the discharge valve.

As to the first function, it is well known that if liquid is unrestrained it will whirl or rotate as it is being discharged through a central orifice, particularly if the receptacle or container is hemispherical. Such whirling serves to produce a vortex or area of reduced pressure and the discharge capacity is materially reduced. The transverse walls serve to prevent whirling and the discharge capacity approximates the theoretically perfect.

As to the second function, the wings or walls serve the important function of intercepting any particles of solid matter and guiding them to the bottom of the casing into a recess at one side of the outlet and below the same. Thus the float-controlled valve cannot become clogged and fail to operate with consequent steam loss.

The invention will be more readily understood by reference to the accompanying drawings, wherein, Figure 1 is a vertical, sectional view of a steam trap constructed in accordance with my invention;

Fig. 2 is a top plan view thereof, and,

Fig. 3 is a sectional view on the line 3—3 of Fig. 1.

In the drawings it will be seen that the casing is composed of two parts, the upper part 10, containing the inlet connection 11, the lower part 12, containing the outlets. The parts are firmly held together by means of bolts 13, which engage the notched ears 14, on the top and bottom sections. By reason of the arrangement shown the parts of the casing may be separated by loosening the nuts on the bolts and without entirely removing the nuts. Furthermore, as the heads of the bolts are seated between the flanges 15, the bolts are held against rotation.

Mounted within the casing is the float-valve 16, which is guided at its upper end by means of the stem 17, operating within the cross-bar 18. The lower end is guided by means of the valve stem 19, which is held within the cylindrical projection 20, from the valve member 21. The water outlet pipe is connected to the nipple 22, the water escaping past the valve stem 19, through the opening 23. By reason of the fact that the cylindrical portion 20, projects upwardly from the bottom of the casing a considerable distance, the outlet from the casing will be above the floor thereof and sediment such as scale and particles of solid matter which have settled to the floor of the casing will not be drawn into the outlet. It is well known that the discharge of liquid from a vessel through a central outlet and particularly a vessel having a round bottom, tends to set up a whirling motion in the liquid. Such motion of the liquid stirs up and prevents the deposit of particles of solid matter and the particles are caused to be discharged through the outlet. Furthermore it is known that the effect of such whirling motion is to cause a vortex at the outlet and materially reduce the discharge capacity. I avoid both of these disadvantages by providing radial walls or webs 24, which project inwardly of the casing at a point below the float, three of such webs being shown. These serve to prevent the whirling of the water and obviate the difficulties referred to. As the water of condensation enters the casing together with any sediment or scale, the latter is thrown to the sides of the casing by contact with the top of the float and descends by gravity along the walls to the sloping body. When the valve tends to discharge the water there is no whirling action and the sediment is not drawn into the outlet. It rests in the groove 25, which surrounds the valve casing and finally is drawn into the recess 26, located at one side of the outlet and below the same. A drain or blow-off pipe 27, is connected with the recess 26, and when the valve controlling the same is opened the sediment is discharged therethrough. Thus a simple means is provided for keeping the valve free from particles which would tend to clog the same and interfere with the operation.

The number and form of the webs and of the sediment recesses is unimportant. Modifications of these and other devices may be made all without departure from the spirit of my invention.

I claim:

1. In a steam trap, the combination of a casing having a hemispherical lower end and provided with an outlet, a float-valve for controlling said outlet, said casing being provided with a cavity in the inner face of the wall thereof at one side of said outlet, and means within the casing for directing sediment into said cavity, substantially as described.

2. In a steam trap, the combination of a casing having a hemispherical lower end and provided with an outlet, a float-valve for controlling said outlet, said casing being provided with a cavity in the inner face of the wall thereof located below the level of the outlet, and means within the casing for directing sediment into said cavity, substantially as described.

3. In a steam trap, the combination of a casing having an outlet, a float-valve for controlling said outlet, a sediment guard projected upwardly around said valve, said casing having in the inner face of the wall thereof a sediment cavity adjacent said valve and below said guard, and means for inducing sediment to enter said cavity, substantially as described.

4. In a steam trap, the combination of a casing having a hemispherical bottom, and a radial web projected inwardly from the lower portion of the casing whereby liquid within the casing is prevented from whirling, substantially as described.

5. In a trap, the combination of a casing having a rounded lower end and provided with a central outlet in said end, and a plurality of inwardly projecting webs for preventing the whirling of liquid within the casing, substantially as described.

6. In a trap, the combination of a casing having an inwardly inclined lower end, said casing having an elevated outlet at the apex of the inclined end, inwardly projecting webs for preventing whirl of the contained liquid and for directing sediment, and means at one side of the outlet for retaining the sediment, substantially as described.

7. In a steam trap, the combination of a casing having an inwardly inclined lower end, said casing having an elevated outlet at the apex of the inclined end, and a sediment cavity in the inner face of the wall thereof extending about and adjacent to said elevated outlet, and inwardly projecting webs for preventing whirl of the contained liquid and for directing sediment into said cavity, said webs extending from near the central part of the casing downwardly to said cavity, substantially as described.

Signed at Chicago, Illinois, this 24th day of September, 1917.

JOHN O. HAMMELL.

Witness:
D. B. QUINLAN.

Copies of this patent may be obtained for five cents each, by addressing the "Commissioner of Patents, Washington, D. C."